United States Patent [19]

Rummel

[11] Patent Number: 5,536,518
[45] Date of Patent: Jul. 16, 1996

[54] CONVERTIBLE GRILL/ROTISSERIE BARBECUE

[75] Inventor: Randy L. Rummel, Huntington Beach, Calif.

[73] Assignee: Dynamic Cooking Systems, Inc., Los Alamitos, Calif.

[21] Appl. No.: 227,658

[22] Filed: Apr. 14, 1994

[51] Int. Cl.$^6$ ............................ A23L 1/00; A47J 33/00; A47J 37/04; A47J 37/07

[52] U.S. Cl. ............................ 426/523; 99/340; 99/400; 99/401; 99/421 H; 99/446; 99/447; 99/450; 99/482; 126/9 R; 126/25 R; 126/41 R; 426/466

[58] Field of Search ............................ 99/339, 340, 389, 99/419, 421 R, 421 H, 421 HH, 421 HV, 421 V, 444–446, 450, 482; 426/523, 466; 126/25 R, 25 A, 9 R, 9 B, 41 B

[56] References Cited

U.S. PATENT DOCUMENTS

| | | | |
|---|---|---|---|
| 2,885,950 | 5/1959 | Stoll et al. | 99/340 |
| 3,358,585 | 12/1967 | Scherer | 99/340 |
| 3,363,543 | 1/1968 | Roberts et al. | 99/340 |
| 3,535,999 | 10/1970 | Chambon | 99/340 |
| 3,543,672 | 12/1970 | Payonk | 99/448 |
| 3,742,838 | 7/1973 | Luschen et al. | 126/25 R |
| 3,848,522 | 11/1974 | Trelc | 99/450 |
| 3,899,961 | 8/1975 | Tanguy | 99/421 H |
| 3,999,472 | 12/1976 | Einto | 99/421 HH |
| 4,072,092 | 2/1978 | Kohli et al. | 99/389 |
| 4,089,258 | 5/1978 | Berger . | |
| 4,120,237 | 10/1978 | Mecherlen | 99/340 |
| 4,770,091 | 9/1988 | Vaughn | 99/421 H |

*Primary Examiner*—Timothy F. Simone
*Attorney, Agent, or Firm*—Knobbe, Martens, Olson & Bear

[57] ABSTRACT

A convertible barbecue capable of grill cooking and rotisserie cooking. The barbecue includes one or more radiant such as briquette trays for holding refractory briquettes underneath a food item to be cooked. In the grill-cooking mode, the briquette trays are supported horizontally underneath a grill rack, while in the rotisserie mode a front briquette tray is removed and a rear briquette tray is angled so as to be out from underneath a spit for rotisserie cooking of food items. In an alternative configuration both front and rear briquette trays may be repositioned toward the rotisserie spit.

10 Claims, 9 Drawing Sheets

CONVERTIBLE GRILL/ROTISSERIE BARBECUE

FIELD OF THE INVENTION

The present invention relates to a barbecue having an improved arrangement for converting from grill cooking to spit cooking.

BACKGROUND OF THE INVENTION

Conventional gas-fired barbecues typically include a housing within which a horizontal array of heat-retaining briquettes or lava rocks or other radiants are mounted over one or more gas burners. A grill rack located horizontally within the housing positions meat or other food over the radiants, which radiate cooking heat thereto. This type of cooking generates a lot of grease and associated unwanted smoke and flame as the grease lands on the hot radiants. This is controllable by controlling the heat, and is not a great problem with quick cooling food. Also, many people desire the effect on the food caused by the flame.

Some conventional barbecue units further include an apparatus for rotating meat on a spit over the grill rack. Unfortunately, the drippings from such a rotisserie arrangement fall onto the heated radiants and cause smoking or flame. This is particularly troublesome with an item requiring cooking for a long period of time, such as chicken or turkey. Although drip pans and other shields have been employed to intercept falling grease, insertion of such devices between the radiants and the food spit can hinder the optimum cooking of the food.

Various vertically mounted fire boxes of specialized construction are found in the prior art for cooking spit-mounted meat from the side. One such arrangement includes a vertical upstanding panel of radiant material mounted over a tubular gas burner, which is detachably mounted within a cooking enclosure to the side of the rotisserie spit. Additionally, a horizontal array of radiants and a burner may be employed below a basting tray under the spit. Disadvantageously, the vertical panel of radiant material must be separately bought and installed to an existing gas barbecue or must be featured in a new grill, the cost of which is increased accordingly.

There is presently a need for a relatively inexpensive and easy-to-use barbecue that can handle both grill cooking and rotisserie cooking with a reduction in grease-generated flame.

SUMMARY OF THE INVENTION

The present invention provides an improved gas-fired barbecue capable of being converted from a grill-cooking mode to a rotisserie-cooking mode with a substantial reduction in grease-generated smoke and flame. The barbecue generally comprises a housing defining an interior cooking area with a pivotable cover adapted to close over the cooking area, and at least one radiant supported within the cooking area configured to hold heat retaining material, such as a plurality of refractory briquettes. The housing is defined by side walls and a bottom wall, with a front control panel for mounting a pair of control knobs. The control knobs actuate gas-supply valves between a source of cooking gas and supply lines leading to a pair of transverse burners positioned in the lower portion of the cooking area.

In the preferred embodiment, there are two tray shaped radiants: a front radiant positioned over a front burner and a rear radiant positioned over a rear burner. The radiants are supported within the cooking area on inwardly projecting flanges mounted to the inner sides of the housing side walls. The flanges are mounted horizontally so as to support the radiants horizontally parallel to and underneath a grill rack for grill cooking. To convert to a rotisserie-cooking mode, the grill rack is removed and at least the rear radiant repositioned on the flanges to assume an angled orientation facing a location at which a rotisserie spit can be mounted transversely across the barbecue. The rear radiant is sized so as to fit in a rear portion of the barbecue cooking area and not underneath the rotisserie spit location. Thus, grease and drippings from a food item mounted on the rotisserie spit can fall directly downward into a basting tray positioned in the bottom of the housing.

In a preferred embodiment, the front radiant is a tray having transversely oriented rows adapted to hold an array of briquettes. The rear tray includes similar but fewer rows than the front tray. The trays, when positioned adjacent each other on the flanges for grill cooking, substantially span the length of the cooking area in order to provide more even grill cooking. To convert to the rotisserie cooking mode, the front tray is preferably removed from the cooking area and the rear tray angled to face the rotisserie spit. In this manner, a large area underneath the rotisserie spit is left open for grease and drippings from a food item mounted thereon to drop into the basting tray. In this mode of operation, only the rear burner underneath the rear tray will be fired to cook the food item on the rotisserie spit.

In an alternative embodiment of the barbecue, the front and rear radiants are approximately identical in size and are both adapted to be placed horizontally on the flanges or angled over their respective burners for rotisserie cooking. The angled supports for the radiants may be provided by the aforementioned flanges, the conversion to rotisserie cooking requiring a manual repositioning of the radiants by an operator. In the alternative, the radiants may be mounted on transverse rotating rods for remotely repositioning the radiants from the exterior of the barbecue housing.

The transverse burners underneath the radiants each includes a row of gas apertures. The gas apertures are formed in a side wall of the burners to emit gas in a horizontal direction. Thus the burners, when lit, emit flames in a horizontal direction. The burners are positioned toward the front and rear of a lower portion of the cooking area, and the gas apertures face inwardly so that the flames are directed toward the center of this lower portion. This allows the burners to more uniformly heat the briquette trays positioned above without necessitating the positioning of the burners directly under the food item being cooked on the center of the grill rack, which might induce additional smoke and flame from the falling grease.

DETAILED DESCRIPTION OF THE PREFERRED EMBODIMENTS

Figure 1:
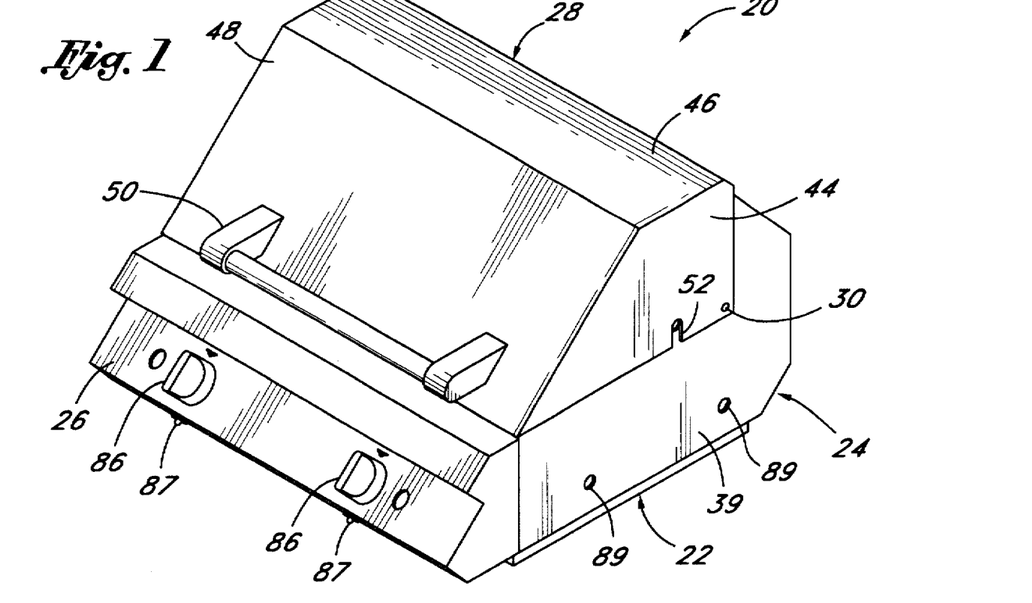
FIG. 1 is a front perspective view of a barbecue grill according to the present invention with a top cover closed.
Figure 2:
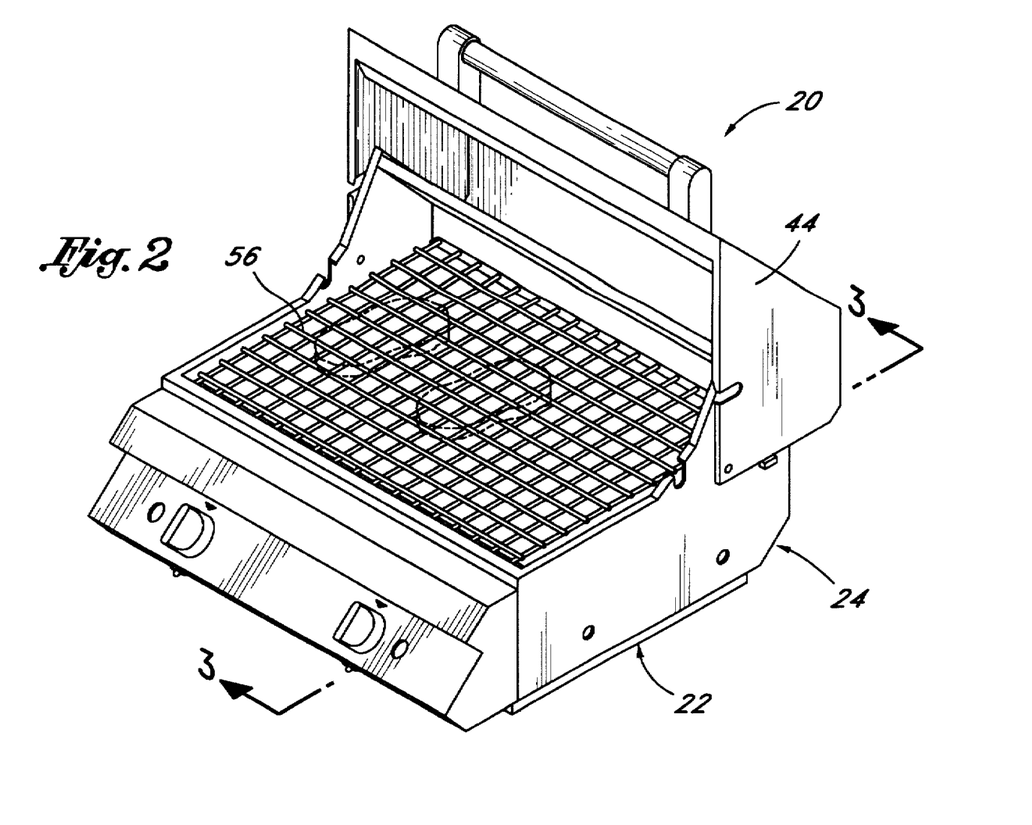
FIG. 2 is a perspective view of the grill of FIG. 1 with the cover open, exposing a grill rack therein.

Referring now specifically to FIGS. 1 and 2, a preferred form of a gas-fired barbecue grill 20 of the present invention is shown. The barbecue grill housing, generally designated 22, consists of a box-shaped main body 24, a front control panel 26, and a top cover 28 pivotably mounted at hinges 30 to the main body. With additional reference to FIG. 3, the main body 24 comprises a front wall 32, a floor 34, a rear wall 36 terminating at an upper end in an upstanding angled rear shield 38, a pair of side walls 39, and a secondary thermal containment wall 40 spaced from and parallel to the front wall and the floor, respectively. The containment wall 40 provides a space 42 therein, which acts as a thermal buffer between the hot components immediately surrounding the cooking area defined within the main body 24 and both the surface on which the grill is mounted and the front control panel 26. The barbecue may be supported on an appropriate foundation or on a wheeled cart (not shown).

The cover 28 comprises a pair of vertical side walls 44, a ceiling 46, and an angled front panel 48 having a handle 50 mounted thereon. A substantial portion of the rear side of the cover 28 is removed so as to provide clearance over and around the rear deflector shield 38. The side walls 44 of the cover 28 further include a vertical slot 52 extending upward from a lower edge and arranged adjacent to a pair of spit support slots 54 formed in an upper portion of the side wall 39 of the main body 24 when the cover 28 is in the closed position.

Figure 3:
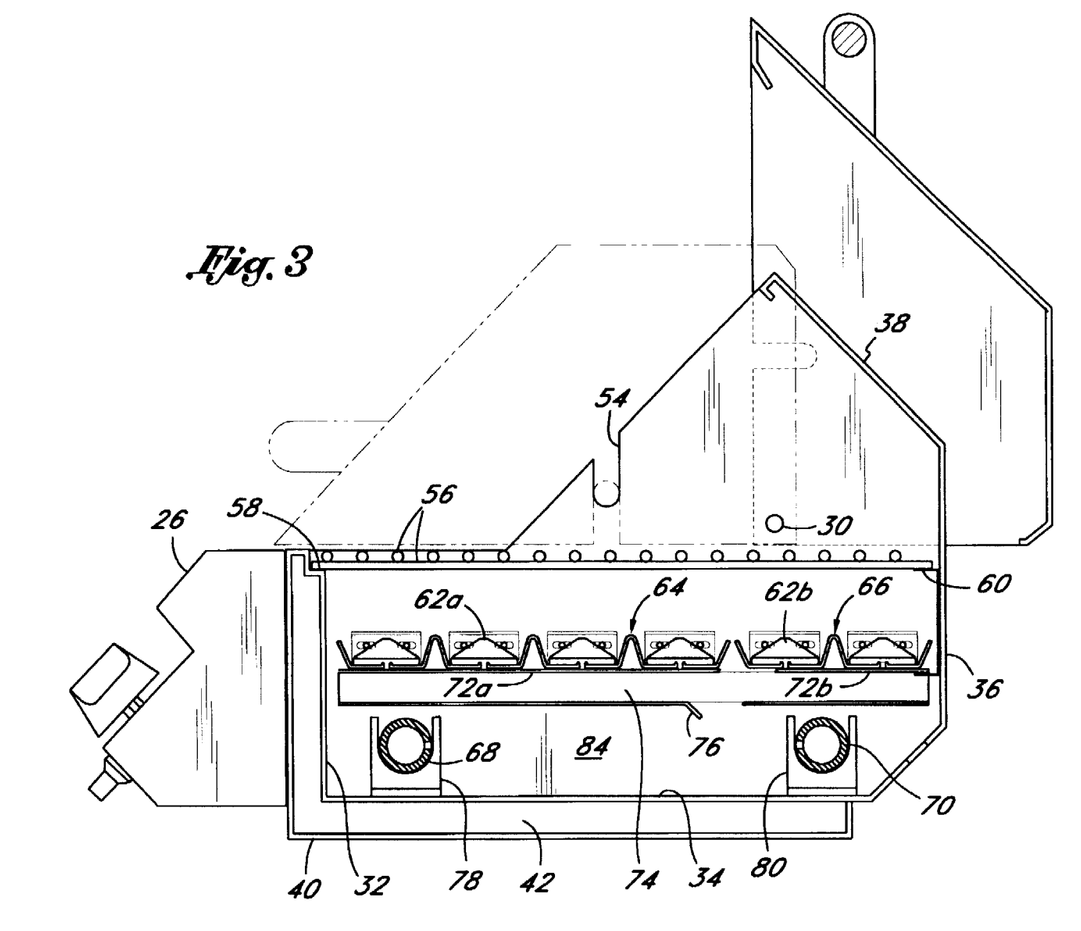
FIG. 3 is a cross-sectional view of the barbecue grill taken along line 3—3 of FIG. 2.
Figure 4:
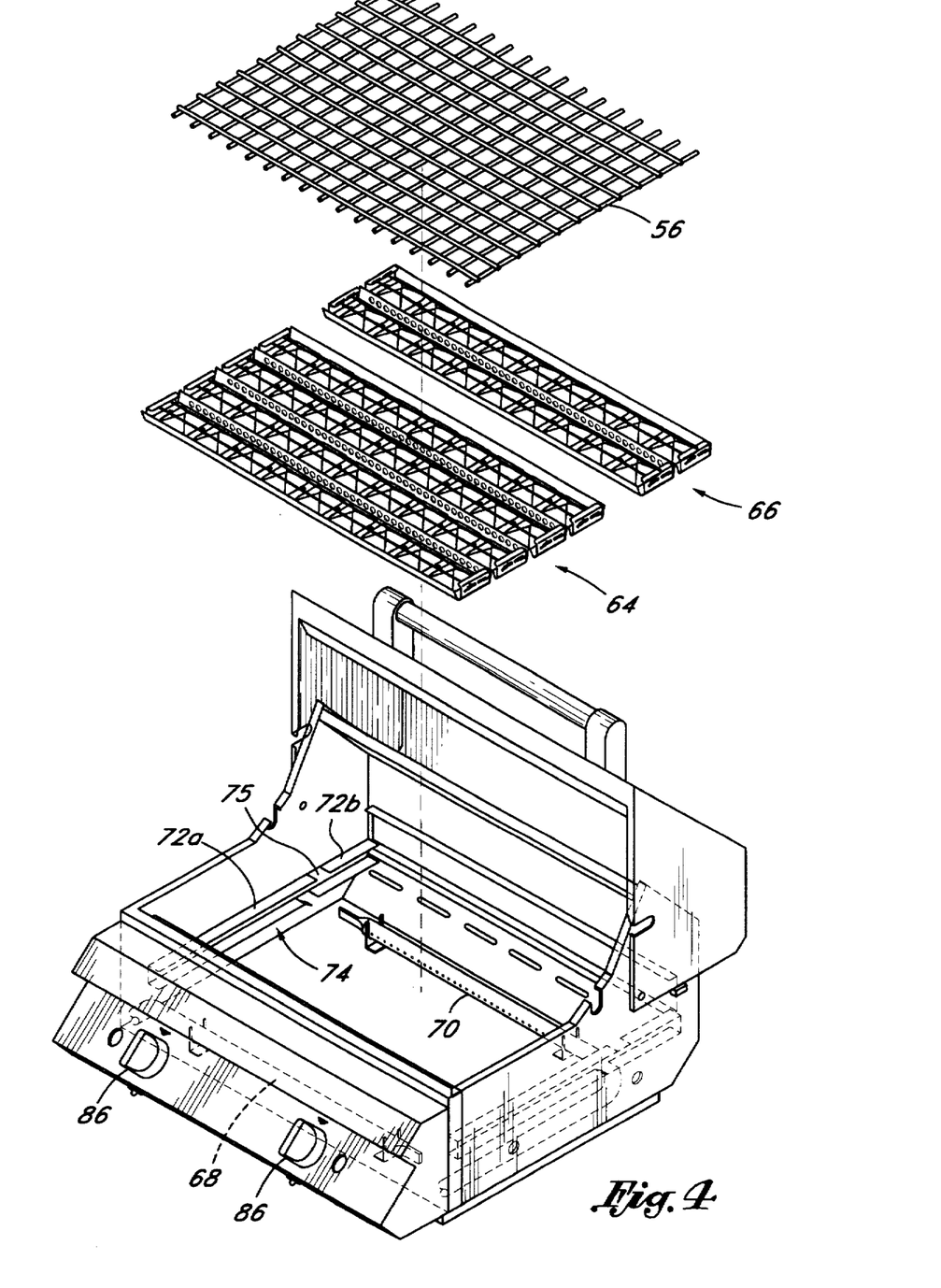
FIG. 4 is an exploded perspective view of the grill of FIG. 2.

The barbecue 20 is shown in FIGS. 2 and 3 in a mode adapted for grill cooking of food. In this mode of operation a grill rack 56, generally defined by a mesh of rigid interconnected rods, is horizontally supported in an upper portion of the interior of the main body 24. As seen from FIG. 3, this support may take the form of a step 58 formed in the front wall 32 and a bracket 60 fixedly mounted to the rear wall 36. Alternatively, side supports or intermittent ledges extending into the interior cooking area of the main body 24 may be utilized. The grill rack 56 is supported horizontally over a horizontal array of heat-retaining material in the form of briquettes 62, which are in turn supported over one or more gas burners. In the present embodiment, briquettes 62a are supported within a front frame or tray 64. The front tray 64 occupies about two-thirds of the grill area covering a central third below the spit slots 54, and a forward third. A second group of briquettes 62b is supported in a rear frame or tray 66 positioned in a rear third of the grill area.

As noted above, the briquette trays are only one type of radiant. Various other radiants may be employed including tray shaped elements or slabs that have sufficient mass to provide the desired evenness of radiation, without supporting any briquettes or other such materials.

The trays 64, 66 rest on flanges inwardly extending from the side walls, and including a front flange portion 72a and a rear flange portion 72b. The flanges 72a, 72b are preferably formed in a single length of a channel-shaped member 74, with a portion of the upper leg removed at a gap 75, defining the front and rear flange portions. The use of a channel-shaped length 74 is advantageous for strength reasons, and also it provides structure for forming an angled rear briquette tray stop 76. A section of the lower leg of the channel member is cut from the rear portion of the channel lower leg and is bent downwardly to form the stop 76. This creates a gap in the channel bar leg.

The front burner 68 lies transversely across the barbecue 20 near the front wall 32. The burner 68 is supported at two or more locations by cradle supports 78 mounted on the floor 34. Likewise, the rear burner 70 is transversely mounted within the barbecue 20 proximate the rear wall 36. The rear burner 70 is also supported by two or more cradle supports 80. The front burner 68 is generally disposed underneath the forward quarter of tray 64 to provide heat to the briquettes. Likewise, the rear burner 70 is positioned underneath the rear tray 76 to provide heat to the briquettes. One end of each of the burners 68, 70 is connected to a gas inlet fitting 71 to be connected to a source of combustible gas such as propane or natural gas. The rear burner connects to the gas line through a conduit (not shown) on a side of the housing where it joins to a single gas inlet. The burners 68, 70 are generally tubular and each includes a longitudinal row of apertures 82 for substantially evenly distributing the combustible gas along their lengths. When the gas is ignited, a row of heating flames is thus emitted from each burner.

In a particularly advantageous arrangement, each of the burners 68, 70 includes the row of apertures 82 formed in a side wall thereof. Thus, the flames emitted from the burners extend horizontally out of the burner tubes rather than upward, as is the case with most conventional burners. As seen from FIG. 3, the flames thus extend horizontally toward the middle of a lower chamber 84 within the barbecue 20. Further, horizontally directed apertures are less likely to clog from falling grease. The lower chamber 84 is substantially covered by the front and rear briquette trays 64, 66 so as to be partially enclosed and capable of retaining heat, enhancing the even heating of all the briquettes 62 and overall efficiency of the barbecue 20. Because of this arrangement the burners 68, 70 may be located further forward and rearward, respectively, within the lower chamber 84 to reduce the instances of flare up from falling grease in the middle region.

Each of the burners 68, 70 is separately controlled via control knobs 86 mounted for rotation on the angled control panel 26. These control knobs 86 actuate valves (not shown) for adjusting the amount of gas flowing through the respective burners 68, 70, as is well known by one of skill in the art. A pair of piezo-electric spark ignitors are provided for each burner 68, 70, which are actuated by buttons 87 (FIG. 1) mounted to the control panel 26. As a backup ignition system, a pair of match apertures 89 are formed in one side wall 39 proximate each burner 68, 70.

Figure 5:
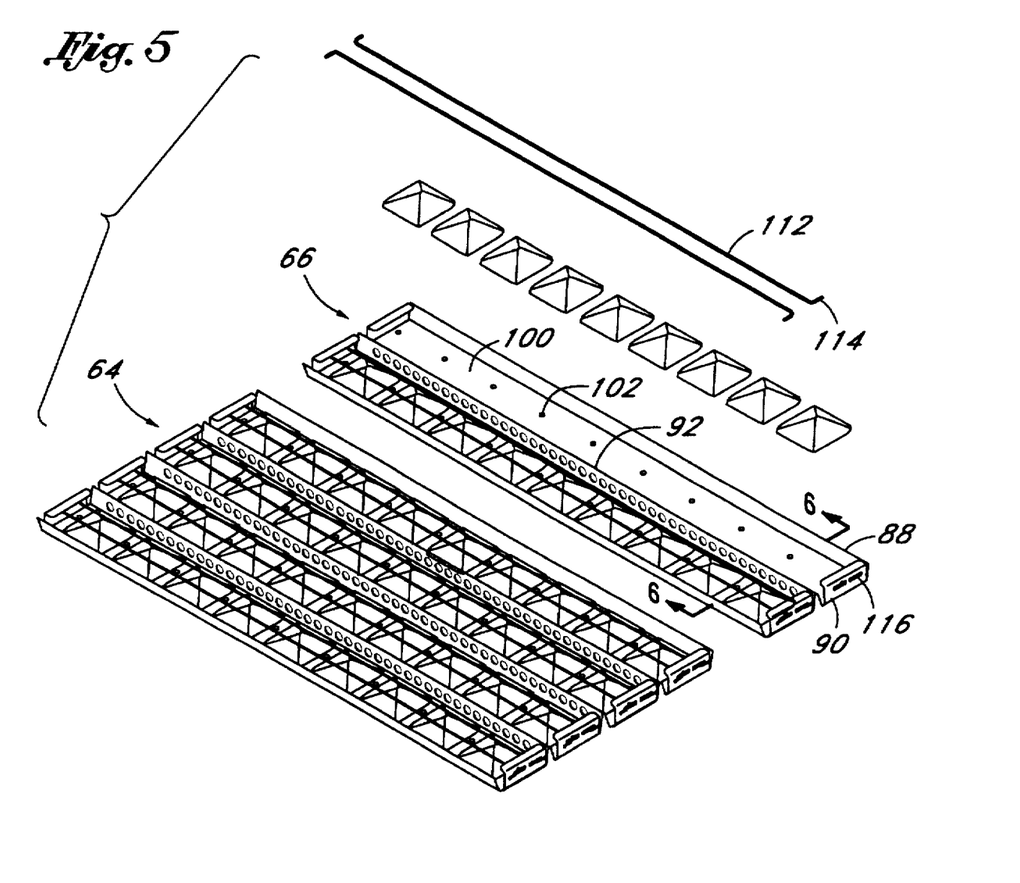
FIG. 5 is an exploded perspective view of a preferred configuration of briquette tray.
Figure 6:
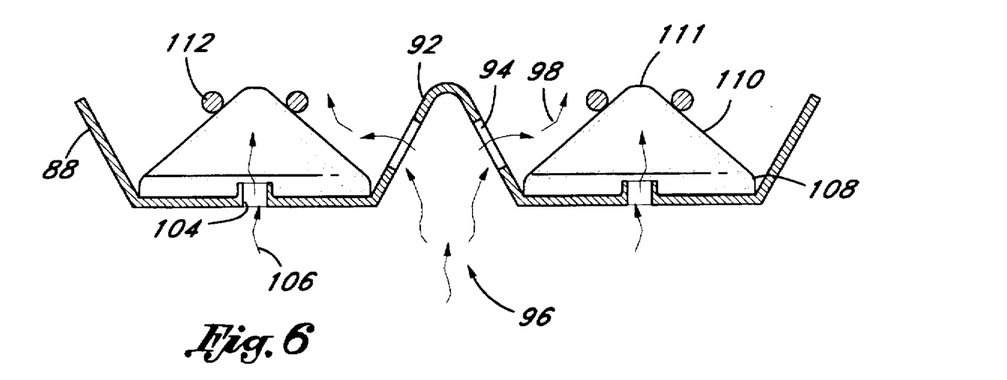
FIG. 6 is a cross-sectional view through a rear briquette tray taken along line 6—6 of FIG. 5.

Referring now to FIGS. 5 and 6, the briquette trays 64, 66 generally comprise sheet metal enclosures for spacing and supporting a plurality of transversely arranged rows of briquettes 62. Each tray includes a pair of side walls 88, a plurality of end walls 90, and one or more partitions 92 separating each briquette row. Further, each briquette row within the trays 64, 66 includes a bottom support panel 100 having a plurality of upstanding nubs 102 formed therein. FIG. 6 shows a cross section through the rear briquette tray and illustrates the preferred upwardly diverging orientation of the side walls 88 and partitions 92. Preferably, each partition 92 is formed by an inverted V-shape, and wherein a row of holes 94 is formed in each of the legs of the V. Heat, indicated by the arrows 96, emanating upwardly from the burners 68, 70 can thus propagate via convection through these holes 94 and come into contact with the briquettes 62. This convective heat may also escape upward past the briquettes 62, as indicated by the arrows 98, to cook the food directly.

The upstanding nubs 102, best seen in FIG. 6, act as positioning spacers between individual briquettes 62 in each of the rows. The spacing of the briquettes 62 within each row further distributes heat and helps ensure even cooking of the food item. Further, each of the nubs 102 includes central holes 104 through which convective heat 106 may pass. In addition to the convective heat transfer described above, the trays themselves conductively transmit heat from the burner flames below into the briquettes 62. The briquettes 62, as described more fully below, are designed to absorb and radiate the heat from the burner flames so as to more evenly cook the food item on the overhead grill rack 56.

The briquettes 62 are preferably formed of a refractory-type material and are defined by a conical or pyramid shape having a base portion 108 and an upper portion 110 terminating in an apex 111. A pair of retaining rods 112 holds each row of briquettes 62 within the separate rows formed in the briquette trays 64, 66. As seen in FIG. 5, these rods 112 extend the transverse length of each of the trays and include end hooks 114 adapted to fit within slots 116 in the end walls 90 of the trays. As seen in FIG. 6, a pair of rods 112 is utilized for holding the briquettes 62 in the trays. Each rod 112 thus contacts the briquettes on one side of the apex 111. The capture of the briquettes 62 within the trays by the rods 112 allows the trays to be lifted and inverted without substantially altering their optimum placement.

Rotisserie Mode of Operation

Figure 7:
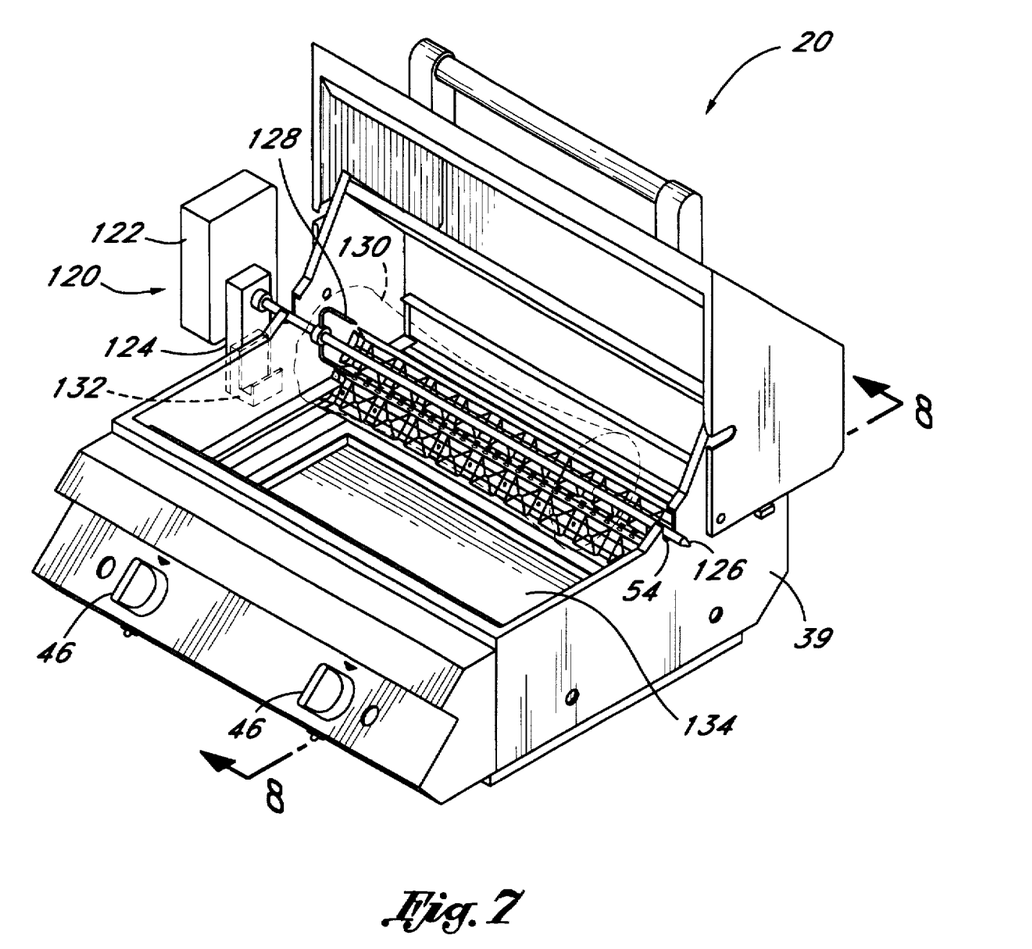
FIG. 7 is a perspective view of the barbecue grill with the cover open and converted to a rotisserie-cooking mode.
Figure 8:
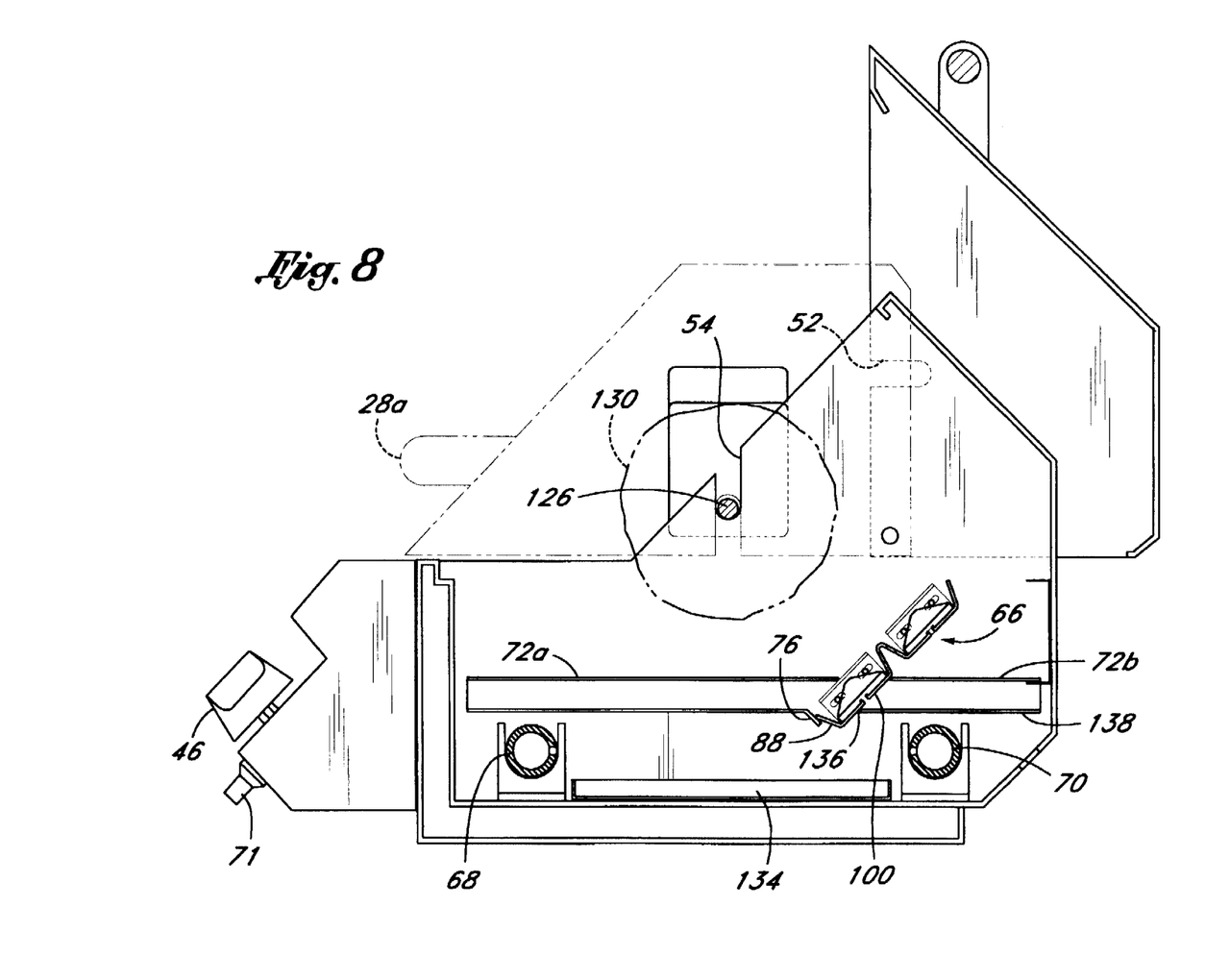
FIG. 8 is a cross-sectional view of the barbecue grill in the rotisserie-cooking mode taken along line 8—8 of FIG. 7.
Figure 9:
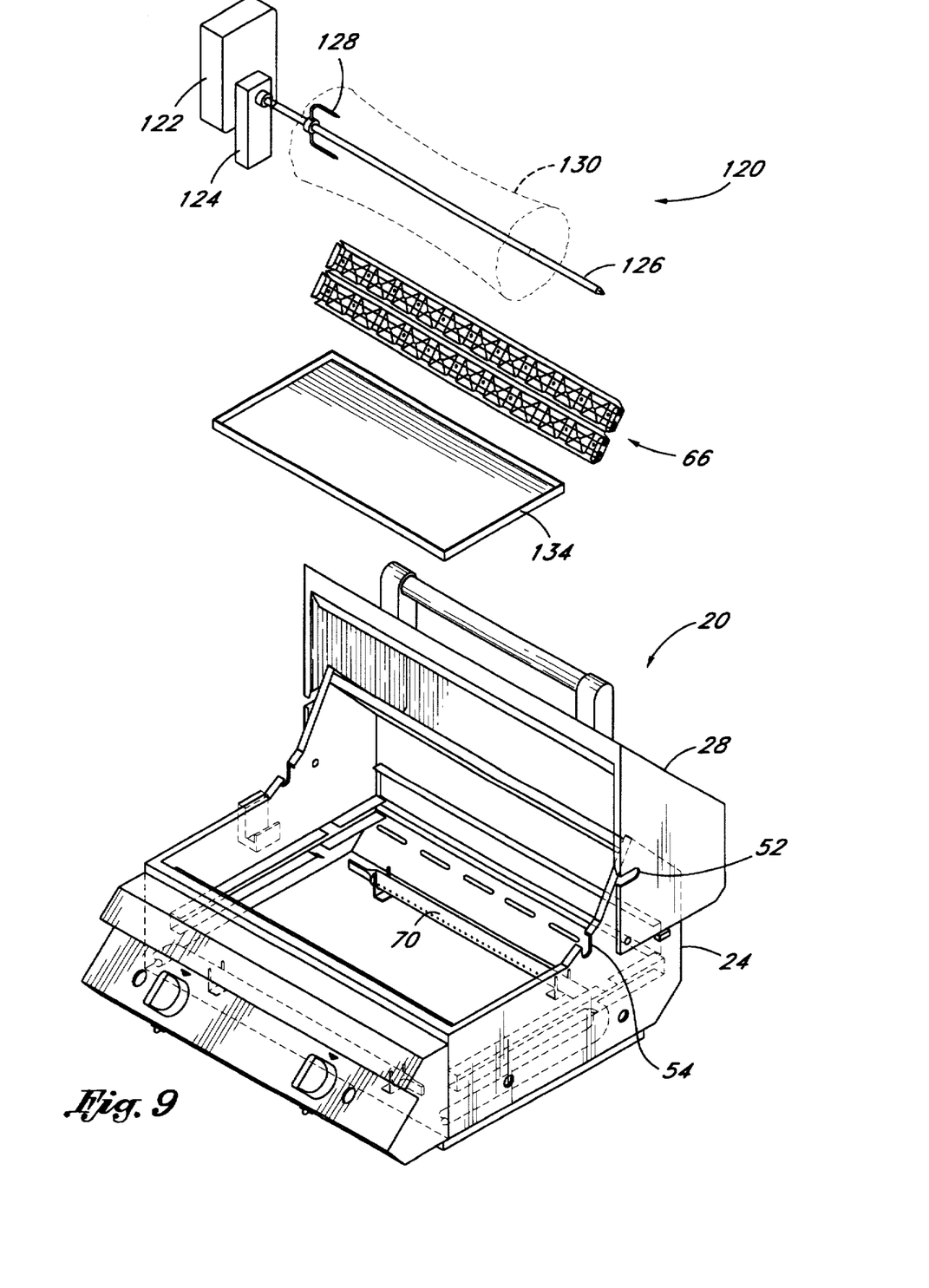
FIG. 9 is an exploded perspective view of the barbecue grill in the rotisserie-cooking mode.

As seen in FIGS. 7–9, the barbecue 20 may be converted from the grill cooking configuration described above to a rotisserie-cooking mode. Rotisserie cooking involves slowly rotating the meat or other food item to be cooked on a spit while applying varying intensities of heat. In FIG. 7 a rotisserie apparatus 120 comprises a rotational motor 122, a mounting bracket 124, and a rotisserie spit 126 adapted for slow rotation by the motor. The rotisserie spit 126 generally comprises an elongated pointed rod for skewering food and may optionally include one or more food-engaging prongs 128 for facilitating rotation of a food item, indicated by the dashed outline 130. The spit 126 extends transversely across the width of the barbecue 20 and is supported within the aforementioned vertical slots 54 formed in an upper edge of an angled portion of the side walls 39 of the main body portion 24. The mounting bracket 124 is adapted to transversely position the spit 126 relative to the main body 24. In this respect, a mounting element 132 may be attached to the main body 24, or other attachment means may be used, as is well known in the art. The spit 126 is effectively journaled about the lower arcuate surface of the slots 54, the slots being positioned slightly above the top edge of the side walls.

As best seen in FIGS. 8 and 9, the front briquette tray 62 is removed for rotisserie cooking and the rear tray 64 angled to assume a position approximately midway between the rear burner 70 and the food item 130. The top surface of the rear tray generally faces the spit area so that the heat it absorbs from the burner is generally radiated towards the food item 130. Preferably the rear tray is supported at an angle of about 45° with respect to horizontal. During cooking, only the rear burner 70 will be ignited, the front burner 68 not being used. The drippings from the food item 130 fall without landing on any of the hot briquettes 62, thus avoiding flare ups. A basting pan 134 may be provided in the lower regions of the main body 24 to catch the drippings from the food item 130. In another common usage, the basting pan 134 is filled with marinating liquids or other spices, and the food item 130 is occasionally basted with this liquid to add flavor thereto. Furthermore, the liquid within the basting pan may be evaporated during the cooking process to provide a more moist and flavorful cooked food.

The rear briquette tray is supported transversely across the main body portion 24 in cut-out portions of the channel length 74. Specifically, the front flange 72a and rear flange 72b are separated at the gap 75 within which the rear briquette tray 64 is angled. A front wall 88 of the rear briquette tray 64 rests on the angled stop 76. The bottom surface 100 of a front row of briquettes rests on a front edge 136 of a lower flange portion 138 of the channel length 74. The arrangement wherein the channel length 74 includes the cut-out regions and angled stop 76 is convenient and strong for supporting the rear briquette tray 66. However, other arrangements for supporting the rear briquette tray in a horizontal or in an angled position are possible, as will be appreciated by one of skill in the art. The important feature of the possible configurations of the present invention is the ability to support both the front and rear briquette trays 64, 66 horizontally below a grill rack 56, and then convert the barbecue 20 into the rotisserie mode by removing the front tray and angling the rear tray to face the spit 126.

The rear burner 70 emits flame in a forward direction toward the lower portion of the angled rear tray 66, which enables convective heat to rise through and heat the briquettes 62b therein. The briquettes 62b are also heated via conduction through the tray 66. The convective heat, along with radiant heat from the briquettes 62 directed towards the food item, cooks the rotating food item 130. During cooking, the cover 28 is pivoted to close over the rotating food item 130 in the dashed-line position 28a. In this position the vertical slot 52 in the cover side walls 44 captures the spit 126 from above. In this manner heat is retained within the barbecue 20 for more efficiently cooking the food item 130.

Figure 10:
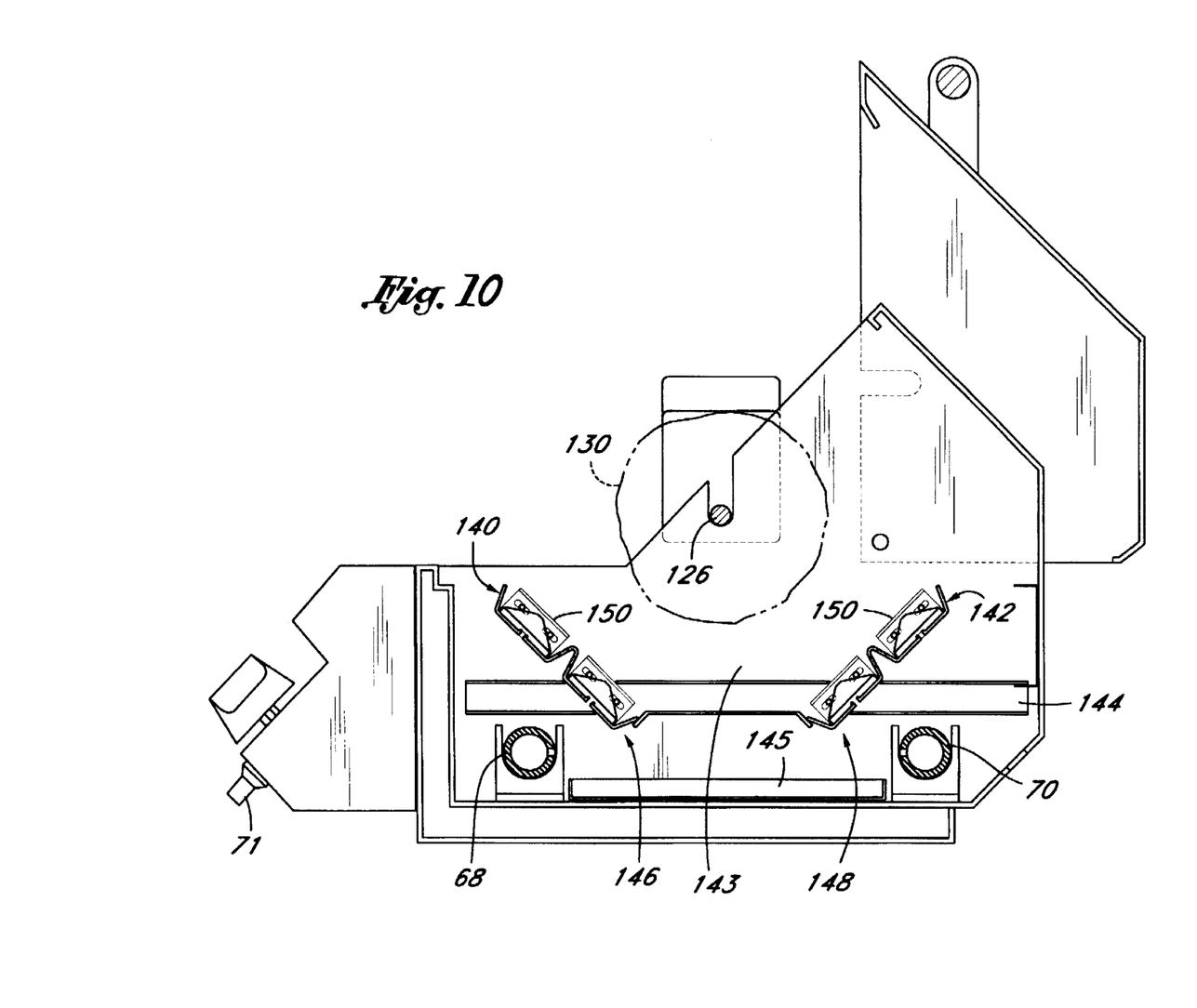
FIG. 10 is a cross-sectional view of the barbecue grill showing an alternative rotisserie-cooking mode.

FIG. 10 shows an alternative embodiment of the rotisserie-cooking mode of operation of the present invention. In this alternative mode a pair of briquette trays, comprising front tray 140 and rear tray 142, are adapted to be angled over the front burner 68 and rear burner 70, respectively. The front tray 140 has fewer briquette rows than in the previously described embodiment, and is therefore shorter. This allows it to be positioned in an opposed relationship to the rear tray 142 and provides a central gap 143 therebetween for grease to fall through to a basting pan 145. The trays may be supported by a channel member 144 having cut-out and angled portions in two locations rather than the single rear location described for the barbecue embodiment of FIGS. 1–9. In this respect the front briquette tray 140 is supported at a front support assembly 146, while the rear briquette tray 142 is supported at a rear support assembly 148. These support assemblies 146, 148 may be as described for the embodiment of FIGS. 1–9 or may comprise other structural supports, as will be apparent to one of skill in the art. The trays 140, 142 may be horizontally oriented over the respective burners 68, 70 and a grill rack used for grill cooking. A third briquette tray (not illustrated) may be provided to fill the gap 143 for grill cooking. As illustrated, however, the barbecue is adapted for rotisserie cooking and the trays are angled so that the briquettes 150 held within are facing the food item 130 impaled on the spit 126. The trays 140, 142 are preferably symmetrically placed about the centerline of the spit 126 to cook both the front and rear undersides of the food item 130 identically.

Figure 11:
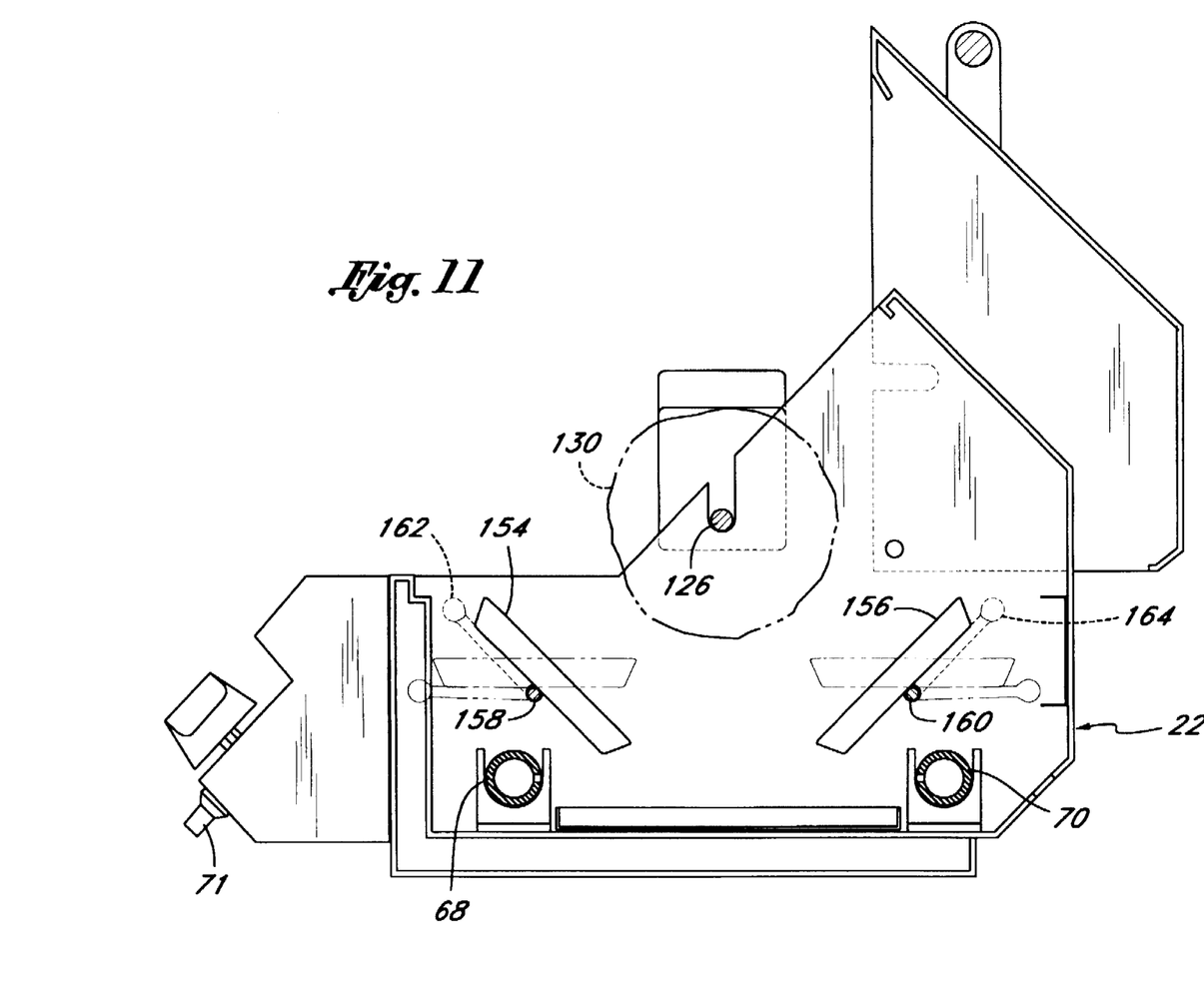
FIG. 11 is a cross-sectional view of the barbecue grill in a rotisserie-cooking mode with a modified briquette tray adjustment assembly.

Although the present invention has been described in terms of a manual conversion between the grill-cooking mode and the rotisserie-cooking mode, a more automated version is contemplated. Specifically, the rear briquette tray of the embodiment of FIGS. 1–9 and both the front and rear briquette trays of the embodiment of FIG. 10 may be mounted about a rotational axis transverse to the main body 24 of the barbecue. FIG. 11 shows schematically such an automated version wherein a pair of briquette trays 154, 156, which are preferably similar to the briquette trays previously described, are adapted to rotate within the barbecue housing 22. In one possible configuration the trays 154, 156 are attached to rods 158, 160, respectively, disposed transversely across the barbecue 20, and journaled to define rotational axes for the trays. One or more exteriorly located handles 162, 164 attached to the rods allow an operator to swivel the trays 154, 156 without reaching into the housing 22. The trays 154, 156, rods 158, 160, or handles 162, 164 preferable include some means for ratcheting or otherwise locking the assemblies in at least two orientations. The trays 154, 156 may thus be oriented horizontally in the grill-cooking mode or be angled in the rotisserie-cooking mode.

The housing 22 of the barbecue 20 may be fabricated from sheet or cast steel and preferably of a non-rusting variety. In particular, non-rusting type 304 Stainless Steel has both strength and durability and is considered ideal for the housing 22. Further, Stainless Steel is preferred for the working components, including the burners, briquette trays, supports, etc. The rigidly connected Stainless Steel parts of the barbecue are desirable hand-welded to ensure quality and longevity. The grill racks are preferably coated with a porcelain enamel for heat retention and easy cleaning.

I claim:

1. A barbecue comprising:

a housing defining a cooking area in a location in which a rotisserie spit is to be mounted;

a first radiant supported within the cooking area in generally horizontal orientation suitable for grill cooking;

an elongated heater disposed underneath the radiant;

supports supporting the radiant transversely across the cooking area in said horizontal orientation or at an angle orientation suitable for rotisserie cooking wherein the radiant is positioned laterally offset from said location and oriented at an angle to generally face said spit location so that heat from the radiant is radiated towards said location, but the majority of dripping is from the food on the spit and does not fall on said radiant; and a second radiant which is supported within the cooking area in a generally horizontal orientation for grill cooking, but is removable for rotisserie cooking;

said radiant supports including flanges extending inwardly from the side walls of said housing and said radiants resting upon said flanges during grill cooking, said flanges including front and rear portions separated by a gap with one of said radiants being generally supported by one of said flange portions and the other said radiants being generally supported by the other of said flange portions, said gap being sized sufficiently to permit an edge of said first radiant to fit into said gap at said angle.

2. The barbecue of claim 1, including a stop supported by said housing for supporting a lower edge of said first radiant when it is positioned in its rotisserie cooking orientation.

3. A barbecue comprising:

a housing defining a cooking area in a location in which a rotisserie spit is to be mounted;

a first radiant supported within the cooking area in a generally horizontal orientation suitable for grill cooking;

an elongated heater disposed underneath and spaced from the radiant;

supports supporting the radiant transversely across the cooking area in said horizontal orientation or in an angled orientation suitable for rotisserie cooking wherein the radiant is positioned laterally offset from said location and oriented at an angle to generally face said spit location so that heat from the radiant is radiated towards said location but the majority of drippings from the food on the spit do not fall on said radiant; and a second radiant which is supported within the cooking area in a generally horizontal orientation for grill cooking, but is removable for rotisserie cooking.

4. The barbecue of claim 3, wherein said radiants include a plurality of refractory briquettes.

5. A barbecue comprising:

a housing defining a cooking area in a location in which a rotisserie spit is to be mounted;

a first radiant supported within the cooking area in a generally horizontal orientation suitable for grill cooking;

an elongated heater disposed underneath the radiant;

supports supporting the radiant transversely across the cooking area in said horizontal orientation or in an angle orientation suitable for rotisserie cooking wherein the radiant is positioned laterally offset from said location and oriented at an angle to generally face said spit location so that heat from the radiant is radiated towards said location but the majority of drippings from the food on the spit do not fall on said radiant; and a second radiant supported within the cooking area, said second radiant occupying a central and forward portion of said cooking area, and said first radiant occupying a rear portion, said supporting structure being adapted to removably support said second radiant in a generally horizontal orientation suitable for grill cooking.

6. A barbecue comprising:

a housing defining a cooking area in a location in which a rotisserie spit is to be mounted;

a first radiant supported within the cooking area in a generally horizontal orientation suitable for grilled cooking; an elongated heater disposed underneath and spaced from the radiant;

supports supporting the radiant transversely across the cooking area in said horizontal orientation or in an angle orientation suitable for rotisserie cooking wherein the radiant is positioned laterally offset from said location and oriented at an angle to generally face said spit location so that heat from the radiant is radiated towards said location but the majority of drippings from the food on the spit do not fall on said radiant;

said first radiant being positioned to the rear of said location; and a second radiant positioned forward from said location, said support supporting said forward radiant in a generally horizontal grilling orientation or in an angled rotisserie orientation wherein the second radiant is oriented to radiate heat towards said location.

7. A barbecue comprising:

a housing defining a cooking area in a location which a rotisserie spit is to be mounted;

a first radiant supported within the cooking area in a generally horizontal orientation suitable for grill cooking;

an elongated heater disposed underneath the radiant, said heater being a gas burner in the form of an elongated tube having a plurality of gas outlets that are oriented to direct gas flow horizontally towards the cooking area; and a flange extending inwardly from each side of the housing and supporting the radiant transversely across the cooking area in said horizontal orientation or in an angled orientation suitable for rotisserie wherein the radiant is positioned laterally offset from said location and oriented at an angle with a lower edge of said radiant extending through a gap in each of said flanges and engaging a lower flange extending inwardly from each side of the housing, said upper flange causing the radiant to generally face said spit location so that heat from the radiant is radiated towards said location, but the majority of drippings from the food on the spit does not fall on said radiant.

8. A gas fired barbecue comprising:

a housing including a plurality of side walls and a bottom defining an inner cooking area;

front and rear radiants supported within the cooking area, said front radiant occupying approximately the forward two-thirds of the cooking area, and the rear radiant occupying generally the rear one-third of said cooking area;

an elongated front gas burner disposed beneath a forward portion of said front radiant, said front burner having a plurality of holes in its side wall opening rearwardly so that the gas emanating from these holes is directed generally rearwardly, and an elongated rear gas burner extending generally beneath said rear radiant, said rear burner having a plurality of holes oriented on a forward side of said rear burner so that gas is directed forwardly from said rear burner; and supports supporting the radiants across the cooking area in a generally horizontal orientation suitable for grill cooking, said supports removably supporting said forward radiant so that it may be removed during rotisserie cooking, and said supports being arranged to support said rear radiant in an angle orientation wherein its upper surface generally faces towards the location in which a rotisserie spit is to be mounted to the barbecue, whereby said barbecue may be readily converted between grill cooking and rotisserie cooking.

9. A method of barbecuing food in either a grilling mode or a rotisserie mode comprising:

supporting a radiant in a generally horizontal orientation in a barbecue cooking area on upper flanges that extend inwardly from housing sidewall portions; extending a heater beneath the radiant;

converting said barbecue to rotisserie cooking by moving said radiant from its generally horizontal position into a rotisserie cooking position wherein the radiant is substantially laterally offset from the rotisserie cooking area, but is still positioned generally above said heater and is angled so that heat radiating from the radiant is generally directed toward said rotisserie area; and supporting said radiant in its rotisserie mode by positioning a lower edge of the radiant in a gap between front and rear portions of said upper flanges to be supported by lower flanges spaced below the upper flanges.

10. A method of barbecuing food in either a grilling mode or a rotisserie mode comprising:

supporting a radiant in a generally horizontal orientation in a barbecue cooking area, and with a heater extending beneath a radiant;

converting said barbecue to rotisserie cooking by moving said radiant from its generally horizontal position into a rotisserie cooking position wherein the radiant is substantially laterally offset from the rotisserie cooking area, but is still positioned generally above said heater and is angled so that heat radiating from the radiant is generally directed towards said rotisserie area;

supporting said radiant in its rotisserie cooking mode to the rear of said rotisserie area;

supporting a forward radiant in a generally horizontal position forward from said rear radiant in a grill cooking mode; and removing said forward radiant from the barbecue during said rotisserie cooking mode.

* * * * *